United States Patent
Yutou et al.

(10) Patent No.: US 8,685,523 B2
(45) Date of Patent: Apr. 1, 2014

(54) SURFACE PROTECTION FILM AND OPTICAL FILM WITH SURFACE PROTECTION FILM

(75) Inventors: Takumi Yutou, Ibaraki (JP); Shinichi Takada, Ibaraki (JP); Mitsushi Yamamoto, Ibaraki (JP); Kazuhito Okumura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 266 days.

(21) Appl. No.: 12/446,167

(22) PCT Filed: Oct. 1, 2007

(86) PCT No.: PCT/JP2007/069203
§ 371 (c)(1),
(2), (4) Date: Apr. 17, 2009

(87) PCT Pub. No.: WO2008/047593
PCT Pub. Date: Apr. 24, 2008

(65) Prior Publication Data
US 2010/0323156 A1 Dec. 23, 2010

(30) Foreign Application Priority Data
Oct. 18, 2006 (JP) ................................. 2006-283881

(51) Int. Cl.
*B32B 7/02* (2006.01)
*B32B 7/10* (2006.01)

(52) U.S. Cl.
USPC ............ 428/141; 428/212; 428/343; 428/354

(58) Field of Classification Search
USPC ......... 428/141, 142, 212, 213, 214, 343, 352, 428/354
See application file for complete search history.

(56) References Cited

U.S. PATENT DOCUMENTS

| | | | |
|---|---|---|---|
| 5,650,215 | A | 7/1997 | Mazurek et al. |
| 5,693,405 | A | 12/1997 | Harvle et al. |

(Continued)

FOREIGN PATENT DOCUMENTS

| | | |
|---|---|---|
| CN | 1272866 | 11/2000 |
| CN | 1323865 | 11/2001 |

(Continued)

OTHER PUBLICATIONS

JP 2005082777A Derwent abstract. Mar. 31, 2005.*

(Continued)

*Primary Examiner* — Maria Veronica D Ewald
*Assistant Examiner* — Nancy Rosenberg
(74) *Attorney, Agent, or Firm* — Knobbe, Martens, Olson & Bear LLP

(57) ABSTRACT

There are provided an optical surface protection film capable of permitting even a visual inspection of a coated body having a fine roughness, such as a prism sheet, to be performed under the condition that the protection film is attached to the coated body and excelling in adhesion reliability without an optical adverse effect on the coated body, and an optical film with the surface protection film. The optical surface protection film (1) has a base material layer (10) and an adhesive layer (12) stacked on one surface of the base material layer. The surface of the base material layer (10) on the side of the adhesive layer (12) has an arithmetic surface average roughness ($Ra_2$) of 0.65 μm or less. The other surface of the base material layer (10) has an arithmetic surface average roughness ($Ra_1$) of 0.6 μm or more.

12 Claims, 1 Drawing Sheet

(56) References Cited

U.S. PATENT DOCUMENTS

| | | |
|---|---|---|
| 6,706,355 B2 | 3/2004 | Holguin et al. |
| 6,773,787 B2 | 8/2004 | Maas et al. |
| 6,784,962 B2 | 8/2004 | Sumida et al. |
| 6,850,310 B1 | 2/2005 | Prechtl et al. |
| 6,908,671 B2 * | 6/2005 | Hosokawa et al. ..... 428/355 AC |
| 7,071,862 B1 | 7/2006 | Scarpulla |
| 2001/0055678 A1 | 12/2001 | Murata et al. |
| 2003/0102081 A1 | 6/2003 | Hosokawa et al. |
| 2004/0005136 A1 * | 1/2004 | Okumura ..................... 385/147 |
| 2004/0018329 A1 | 1/2004 | Katoh et al. |
| 2005/0056127 A1 | 3/2005 | Yamabuchi et al. |
| 2005/0128379 A1 | 6/2005 | Matsunaga et al. |
| 2005/0253276 A1 | 11/2005 | Yamanaka et al. |
| 2005/0253277 A1 | 11/2005 | Yamanaka et al. |
| 2006/0153979 A1 * | 7/2006 | Asakura et al. ............... 427/164 |

FOREIGN PATENT DOCUMENTS

| | | |
|---|---|---|
| CN | 1480323 | 3/2004 |
| DE | 19724871 A1 | 12/1997 |
| EP | 0 992 558 | 4/2000 |
| JP | 01-199865 | 8/1989 |
| JP | 5-229082 | 9/1993 |
| JP | 08-259914 | 10/1996 |
| JP | 11-1205 | 1/1999 |
| JP | 11-181370 | 7/1999 |
| JP | 11-353709 | 12/1999 |
| JP | 2000-158611 | 6/2000 |
| JP | 2000-347010 | 12/2000 |
| JP | 2001-030427 | 2/2001 |
| JP | 2003-129020 | 5/2003 |
| JP | 2003-201452 | 7/2003 |
| JP | 2003-213229 | 7/2003 |
| JP | 2003-226354 | 8/2003 |
| JP | 2003-227932 | 8/2003 |
| JP | 2003-237833 | 8/2003 |
| JP | 2003-273189 | 9/2003 |
| JP | 2004-004417 | 1/2004 |
| JP | 2004-034631 | 2/2004 |
| JP | 2004-067958 | 3/2004 |
| JP | 2004-094012 | 3/2004 |
| JP | 2004-268328 | 9/2004 |
| JP | 2005082777 A * | 3/2005 |
| JP | 2005-122147 | 5/2005 |
| JP | 2005-306996 | 11/2005 |
| JP | 2005-309071 | 11/2005 |
| JP | 2007-008073 | 1/2007 |
| JP | 2007-253435 | 10/2007 |
| WO | WO 99/18166 | 4/1999 |
| WO | WO 99/24519 | 5/1999 |
| WO | WO 03/40049 | 5/2003 |
| WO | WO 03/70603 | 8/2003 |
| WO | WO 2005/026066 | 3/2005 |

OTHER PUBLICATIONS

English Machine Translation of JP 08-259914, Oct. 1996, Japanese Patent Office.

International Search Report issued on the corresponding PCT Application No. PCT/JP2007/069203, dated Dec. 18, 2007.

File History of the related U.S. Appl. No. 11/109,138, as of Apr. 10, 2009.

File History of the related U.S. Appl. No. 11/109,568, as of Apr. 10, 2009.

Notification of Reasons for Refusal mailed by Japanese Patent Office on Sep. 22, 2011 in the corresponding Japanese patent applicatin No. JP 2006-283881.

Notification of Reasons for Refusal dated Jul. 17, 2012 in corresponding Japanese patent application No. 2006-283881.

Office Action dated Aug. 23, 2013 in corresponding Taiwanese patent application No. 096138397.

Notification of Reasons for Refusal dated Feb. 8, 2013 in corresponding Japanese patent application No. 2006-283881.

Decision of Refusal dated Jun. 4, 2013 in corresponding Japanese patent application No. 2006-283881.

Notice of Preliminary Rejection dated Dec. 30, 2013 in corresponding Korean patent application No. 10-2009-7009929.

* cited by examiner

SURFACE PROTECTION FILM AND OPTICAL FILM WITH SURFACE PROTECTION FILM

This application is the U.S. National Phase under 35 U.S.C. §371 of International Application No. PCT/JP2007/069203, filed Oct. 1, 2007, which claims priority to the Japanese Patent Application No. 2006-283881, filed Oct. 18, 2006. The International Application was not published in English under PCT Article 21(2).

FIELD OF THE INVENTION

The invention relates to a surface protection film for optical films (optical sheets) used in liquid crystal displays (LCDs), plasma displays, organic electroluminescence (EL) displays, field emission displays, and so on, and also to an optical film with surface protection film. In particular, the invention preferably relates to a surface protection film for an optical film having a fine uneven pattern such as a lens sheet or a prism sheet including a prism-patterned portion of an acrylic resin or the like precisely-formed on the surface of highly transparent polyester film or the like.

BACKGROUND ART

Hitherto, when processing or conveying plastic products or metal plates, the adherend is protected by adhering a surface protection film temporarily so as to prevent the adherend from injuring. As such surface protection film of products, an adhesive film having a pressure-sensitive adhesive layer provided at one side of a base film is used.

Particularly when an optical sheet (optical film) called prism sheet or lens sheet is used as an adherend, a rubber-based pressure-sensitive adhesive is generally used for the surface protection film so as not to optically affect the precisely-formed prism (lens) pattern of acrylic resin (see, for example, Patent Document 1 below). However, since the prism surface has an uneven pattern in the order of several 10 μm, its contact area with the pressure-sensitive adhesive is very small as compared with other adherends. Therefore, it is difficult to stably attach the protection film to the prism face.

For this disadvantage, a technique is proposed in which the pressure-sensitive adhesive layer is made thick so that it can more closely adhere to the uneven pattern of the prism. In this case, however, the pressure-sensitive adhesive is unevenly distributed into the uneven pattern of the prism so that the light transmittance can be made uneven, and as a result, another disadvantage arises in that unevenness of pressing marks (imprinting marks) is produced in the appearance of the protection film attached to the prism face, so that it can be difficult to perform an appearance inspection of the prism sheet together with the protection film attached thereto.

In order to prevent the unevenness in the appearance, a surface protection film with a rough surface (with a large surface roughness) may be attached to the prism sheet. In such a case, however, the surface protection film causes deformation of the prism shape so that dot-like optical defects can be produced in the prism sheet. The dot-like optical defects can degrade the optical properties of the prism sheet and render the product valueless.

However, there is a trade-off between these disadvantages, and in conventional technologies, there has been no surface protection film that can overcome both disadvantages at the same time.

Patent Document 1: Japanese Patent Application Laid-Open (JP-A) No. 11-181370

DISCLOSURE OF INVENTION

Objects to be Achieved by the Invention

An object of the invention is therefore to address the drawbacks described above and provide an optical surface protection film that allows an appearance inspection of an adherend thereto such as a prism sheet having a fine uneven pattern, does not affect optical properties of the adherend, and has a high level of adhesion reliability. Another object of the invention is to provide an optical film with surface protection film using such a surface protection film.

Means for Solving the Problems

As a result of investigations to achieve the objects, the inventors have found that the objects can be achieved using the surface protection film described below, and completed the invention.

Specifically, the invention is directed to an optical surface protection film including a substrate layer and a pressure-sensitive adhesive layer placed on one side of the substrate layer, wherein the substrate layer has a pressure-sensitive adhesive layer-side surface with an arithmetic average surface roughness ($Ra_2$) of 0.65 μm or less and another surface with an arithmetic average surface roughness ($Ra_1$) of 0.6 μm or more.

The optical surface protection film of the invention is configured to include the specific substrate layer and the pressure-sensitive adhesive layer and therefore allows an appearance inspection of an adherend having a fine uneven pattern, does not affect optical properties of the adherend, and has a high level of adhesion reliability. Particularly when the protection film and the adherend are used in the form of a roll, optical defects and pressing marks (imprinting marks) can be prevented, which would otherwise be significant. In addition, since the adherend with the surface protection film can be easily subjected to an appearance inspection, workability can be significantly improved as compared with conventional techniques.

It is noted that the surface protection film of the invention is intended to include not only films but also other film-like products such as surface protection tapes and surface protection sheets.

The optical surface protection film is characterized in that the arithmetic average surface roughness ($Ra_1$) is 0.6 or more and that the other arithmetic average surface roughness ($Ra_2$) is 0.65 or less. The use of the substrate layer having such characteristics allows prevention of optical defects and pressing marks (imprinting marks). As used herein, the term "arithmetic average surface roughness" refers to values measured according to JIS B 0601. More specifically, the arithmetic average surface roughness may be measured under the following measurement conditions: VSI mode (vertical scanning interference mode); Michelson interference mode; objective lens, ×2.5; internal lens, ×0.5; measurement range, 5 mm×5 mm; threshold, 1%. For example, the arithmetic average surface roughness is preferably measured with an optical profiler NT-3300 (manufactured by Veeco Corporation).

The surface protection film preferably has a haze value of 30 to 75%. As used herein, the term "arithmetic average surface roughness" refers to values measured according to JIS P 8116.

The thickness of the pressure-sensitive adhesive layer is preferably from 2 to 10 μm. When such a pressure-sensitive adhesive layer is used, defective appearance or an adverse effect on the optical properties can be more reliably prevented, and a high level of adhesion reliability can be provided.

Further, the pressure-sensitive adhesive layer is preferably made of a rubber-based pressure-sensitive adhesive.

In addition, the surface protection film with optical film of the invention is characterized by including the optical film, specifically a prism sheet, and the optical surface protection film attached to one or both sides of the optical film. The optical film of the invention is equipped with the surface protection film having the advantage described above and therefore allows an appearance inspection while attaching the protection film, and it does not affect optical properties of the adherend, and has a high level of adhesion reliability.

DESCRIPTION OF REFERENCE SYMBOLS

Figure 1:
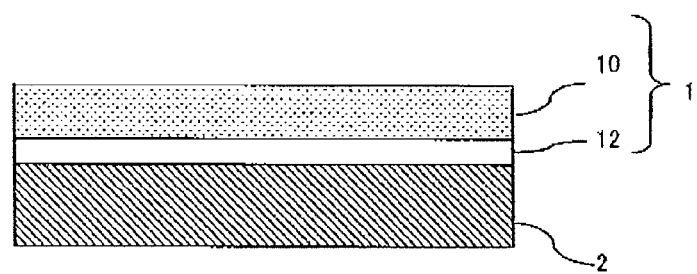
FIG. 1 is a cross-sectional view showing an embodiment of the use of the optical surface protection film of the invention.

In the drawings, reference numeral 1 represents an optical surface protection film, 10 a substrate layer, 12 a pressure-sensitive adhesive layer, 14 a release-treated layer, and 2 an optical sheet (prism sheet).

BEST MODE FOR CARRYING OUT THE INVENTION

Embodiments of the invention are described in detail below with reference to the drawings.

Figure 2:
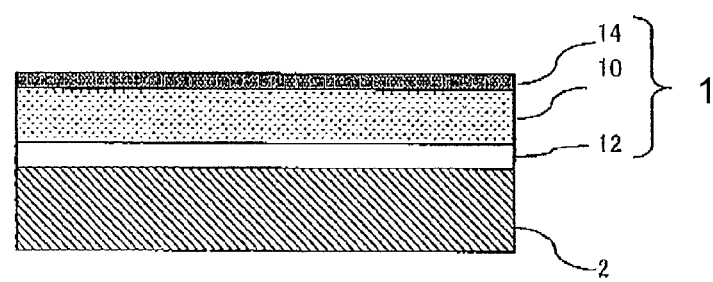
FIG. 2 is a cross-sectional view showing another embodiment of the use of the optical surface protection film of the invention.

As shown in FIG. 1 or 2, the optical surface protection film 1 of the invention includes a substrate layer 10 and a pressure-sensitive adhesive layer 12 placed on one side of the substrate layer 10, wherein the pressure-sensitive adhesive layer 12-side surface of the substrate layer 10 has an arithmetic average surface roughness ($Ra_2$) of 0.65 μm or less, and the other side surface of the substrate layer 10 has an arithmetic average surface roughness ($Ra_1$) of 0.6 μm or more.

As shown in FIG. 1 or 2, the pressure-sensitive adhesive layer 12 is placed on one side of the substrate layer 10 according to the invention. It is characterized in that the pressure-sensitive adhesive layer 12 side-surface of the substrate layer 10 has an arithmetic average surface roughness ($Ra_2$) of 0.65 μm or less, while the other side surface of the substrate layer 10 has an arithmetic average surface roughness ($Ra_1$) of 0.6 μm or more.

The arithmetic average surface roughness ($Ra_1$) of the substrate layer 10 is 0.6 μm or more, preferably from 0.6 to 1.0 μm, more preferably from 0.7 to 0.8 μm. When the arithmetic average surface roughness ($Ra_1$) is more than 1.0 μm, the surface profile of the substrate layer 10 can be transferred to itself when it is formed into a roll so that optical defects can be easily produced in the prism face of a prism sheet or any other adherend 2 attached thereto. When the arithmetic average surface roughness ($R_1$) is less than 0.6 μm, the surface of the surface protection film 1 can be so smooth that uneven application of pressure during lamination or the like may be more likely to produce a localized pressing mark (imprinting mark) and a defective appearance, and, consequently, it may be not easy to perform an appearance inspection of the adherend together with the protection film attached thereto.

Further, the arithmetic average surface roughness ($R_2$) of the substrate layer 10 is 0.65 μm or less, preferably 0.6 μm or less, more preferably 0.5 μm or less. When the arithmetic average surface roughness ($R_2$) is more than 0.65 μm, the protection film can cause deformation of a prism when attached to a prism sheet or the like so that the optical properties of the prism sheet may be degraded.

The base layer 10 is, preferably, a plastic film.

Examples of the plastic film include polyethylene film, polypropylene film, polyester film, polycarbonate film, and polystyrene film. These films may be used either alone or in combination of two or more types as mixed plastic film. The films may be laminated to be formed as plastic film.

The thickness of the base layer 10 is not particularly specified, but is preferred to be 10 to 200 μm, more preferably 15 to 100 μm, particularly preferably 20 to 70 μm. If the thickness is too small, the strength when peeling off the surface protection film 1 or the surface protecting function may be insufficient. If the thickness is too large, it may be disadvantageous in the aspect of handling or cost.

The rough surface of the substrate layer 10 may be formed, for example, by adding an anti-blocking agent such as natural zeolite, synthetic zeolite, natural silica, synthetic silica, crosslinked PMMA, or ultra-high molecular weight PE, block PP, PE, EVA, EVOH, random PP, a reactor blend of PP and a rubber component, an ethylene-α-olefin copolymer, a propylene-α-olefin copolymer, an ethylene-propylene-α-olefin copolymer, an ethylene-methyl methacrylate copolymer, PET, PBT, 6-nylon, or 12-nylon to the material used to form the substrate layer 10.

The base layer 10 may contain deterioration preventive agents, such as antioxidant, ultraviolet absorbent, hindered amine photostabilizer, other photostabilizers, antistatic agent, and also other additives, for example, calcium oxide, magnesium oxide, silica, zinc oxide, titanium oxide, other fillers, pigment, eye-discharge preventive agent, lubricant, anti-blocking agent, foaming agent, polyethylene imine, and others, as appropriate. These compounds may be used either alone or in combination of two or more types as mixture.

The surface of the base layer 10 may be treated appropriately for enhancing the adhesion to the pressure-sensitive adhesive layer 12 or backside treatment layer 14 by, for example, corona discharge process, ultraviolet emission process, flame process, plasma process, and spatter etching process, or for controlling the adherability or improving the adhering job by surface treatment, easy adhesion process, or undercoat process.

On the other hand, the optical surface protection film 1 of the invention is also characterized by including the pressure-sensitive adhesive layer 12 provided on one side of the substrate layer 10.

As shown in FIG. 1 or 2, the optical surface protection film 1 of the invention has the pressure-sensitive adhesive layer 12 on one side of the substrate layer 10. In addition, the optical surface protection film 1 of the invention may be used in the form of a sheet, a tape, or the like. The pressure-sensitive adhesive layer 12 may be a single layer or a laminate of two or more layers.

Any known removable pressure-sensitive adhesive such as a rubber-based pressure-sensitive adhesive or a (meth)acrylic pressure-sensitive adhesive may be used to form the pressure-sensitive adhesive layer 12. When the prism sheet 2 is made of acrylic resin, a rubber-based pressure-sensitive adhesive is particularly preferred for the prism face of the prism sheet 2 in order to prevent the prism face from having a defective appearance.

Examples of rubber material pressure-sensitive adhesive include natural rubber, copolymer of natural rubber with methyl methacrylate or other acrylic component, styrene block copolymer and its hydrogen additives, and styrene-butadiene-styrene block copolymer and its hydrogen additives. In particular, a copolymer of natural rubber with methyl methacrylate or other acrylic component is preferred. These materials may be used either alone or in combination of two or more types.

By controlling the Mooney viscosity of the pressure-sensitive adhesive agent, workability and adhesion reliance can be enhanced.

The pressure-sensitive adhesive agent may contain other known additives, for example, crosslinking agent, vulcanizing agent, silane coupling agent, tackifier, coloring agent, pigment, other powder, dyestuff, surface active agent, plasticizer, surface lubricant, leveling agent, softening agent, antioxidant, anti-aging agent, photostabilizer, ultraviolet absorbent, polymerization inhibitor, inorganic or organic filler, metal powder, granules, foils, and others, which may be added appropriately depending on the application. By adding a reducing agent within a controllable range, a redox system may be composed.

The tackifier includes petroleum resin, phenol resin, rosin resin, terpene resin, and others. They may be used either alone or in combination of two or more types.

The blending amount of tackifier is not particularly specified, but is about 1 to 200 parts by weight, preferably 10 to 170 parts by weight in 100 parts by weight of rubber.

The crosslinking agent and vulcanizing agent to be used appropriately include, for example, isocyanate crosslinking agent, thiuram vulcanizing agent, quinoid vulcanizing agent, quinone dioxime vulcanizing agent, maleimide vulcanizing agent, and others. They may be used either alone or in combination of two or more types.

The blending amount of crosslinking agent and vulcanizing agent is not particularly specified, but is about 0.1 to 20 parts by weight, preferably 0.1 to 10 parts by weight in 100 parts by weight of rubber.

The surface of the pressure-sensitive adhesive layer 12 may be treated for easy adhesion by, for example, corona process or plasma process.

The thickness of the pressure-sensitive adhesive layer 12 is preferably from 2 to 10 µm, more preferably from 2 to 9 µm, even more preferably from 2 to 6 µm. On the other hand, when the thickness of the pressure-sensitive adhesive layer 12 is more than 10 µm, the adhesive strength can be so high that the removability may be reduced after the surface protection film 1 is attached. The prism sheet 2 or the like whose prism face is attached to the surface protection film 1 may be formed into a roll or subjected to punching and then several tens pieces of lens sheets with the resulting surface-protection-film 1 may be laminated. In such a case, partially uneven pressure to the lamination of the surface protection film 1 and the lens sheet may be more likely to produce a localized pressing mark (imprinting mark) and a defective appearance, and, consequently, it may be difficult to perform an appearance inspection of the lens sheet with the surface protection film 1 attached thereto. When the thickness of the pressure-sensitive adhesive layer 12 is less than 2 µm, it may fail to stably adhere to the regularly-shaped surface of the prism face or the like and may come off.

When the pressure-sensitive adhesive layer 12 is exposed at the surface, the pressure-sensitive adhesive layer 12 may be covered with a release sheet (a separator or release film), which has undergone release treatment, until it is actually used.

Examples of the material used to form the separator include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer 12 may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 µm, preferably from about 5 to about 100 µm.

When necessary, the separator may be treated with a release agent such as silicone-based resin, fluorine-based resin, polyvinyl alcohol-based resin, long-chain alkyl ($C_{12}$ to $C_{22}$)-based resin, or fatty acid amide-based resin, or any modification thereof, or may be subjected to release and antifouling treatment with silica powder or the like or to antistatic treatment of coating type, kneading and mixing type, vapor-deposition type, or the like. In particular, when the surface of the separator is appropriately subjected to release treatment such as silicone treatment, long-chain alkyl treatment, or fluorine treatment, the releasability from the pressure-sensitive adhesive layer 12 can be further increased.

In addition, the sheet that has undergone release treatment in the above production method may be used as a separator for surface-protective pressure-sensitive adhesive films without modification, so that the process can be simplified.

As shown in FIG. 2, the optical surface protection film 1 of the invention may further include a release-treated layer 14 that is provided on the other side surface of the substrate layer 10 opposite to the pressure-sensitive adhesive layer 12-side surface.

For example, silicone-based resin, fluorine-based resin, polyvinyl alcohol-based resin, long-chain alkyl ($C_{12}$ to $C_{22}$)-based resin, or fatty acid amide-based resin, or any modification thereof may be used as a release agent to form the release-treated layer 14. Silicone-based resin is particularly preferred in view of the resultant properties, cost, and so on. One or more of these materials may be used alone or in any combination.

Further, the release agent layer 14 may be formed using any appropriate known method of forming release-treated layer such as coating or transfer.

On the other hand, the optical surface protection film 1 including the substrate layer 10 and the pressure-sensitive adhesive layer 12 may be produced using various methods with no particular limitation. Examples of such methods include a method including the step of melting and coextruding the respective layer-forming resin materials to form a laminate and a method including the steps of independently forming the respective layers in the shape of films by extrusion or the like and bonding them with a pressure-sensitive adhesive or the like. Among these methods, the coextrusion method or the melt coextrusion method is preferred, because it can provide a high level of adhesion between the respective layers and simplify the process.

Further, in an embodiment of the invention, the optical surface protective film 1 may be characterized by having a haze value of 30 to 75%, preferably 30 to 60%, more preferably 35 to 60%. When the optical surface protection film 1 has a haze value of more than 75%, it may be difficult to perform an appearance inspection of the optical sheet 2, such as a prism sheet, with the surface protection film 1 attached thereto. When the optical surface protection film 1 has a haze value of less than 30%, uneven application of pressure during lamination or the like may form an apparent localized pressing mark (imprinting mark) on the surface protection film 1, which may have an adverse effect on an appearance inspection of the optical sheet 2, such as a prism sheet, with the surface protection film 1 attached thereto.

Furthermore, the surface protection film with optical film of the invention is characterized by including the optical film 2, specifically a prism sheet, and the optical surface protection film 1 attached to one or both sides of the optical film 2. The optical film of the invention is equipped with the optical surface protection film 1 having the advantage described above and therefore allows an appearance inspection while attaching the protection film, and it does not affect optical properties of the adherend and has a high level of adhesion reliability.

The optical film includes, for example, polarizing plate or polarizer, reflector or transreflector, retardation plate (including half or quarter wavelength plate), viewing angle compensation film, brightness enhancement film, prism sheet or lens sheet, diffusing plate, and other optical layer used in forming of liquid crystal display device. In an embodiment of the invention, an optical film having a fine uneven pattern such as a lens sheet or a prism sheet with a precisely-formed prism pattern is most preferably used as the optical film 2.

EMBODIMENTS

The configuration and effects of the invention are described below by referring to exemplary embodiments. In the embodiments, the performance items were evaluated as follows.

Example 1

A 40 μm-thick polypropylene film with both sides corona-treated was used as a substrate layer (support), which had an inner-side surface with an arithmetic average surface roughness ($Ra_2$) of 0.58 μm and a pressure-sensitive adhesive layer-side (outer-side) surface with an arithmetic average surface roughness ($Ra_1$) of 0.64 μm. A silicone-based polymer release agent (KS-847H manufactured by Shin-Etsu Chemical Co., Ltd.) was dissolved in a dilution solvent, and the solution was applied to the outer side of the substrate layer and dried to form a release-treated layer. As pressure-sensitive adhesive layer, n 100 parts by weight of a natural rubber graft copolymer (Mooney viscosity: 100, measurement conditions: MS (1+4), 100° C.) containing 30% by weight of poly(methyl methacrylate) and 30 parts by weight of a tackifier resin (Quintone A-100 manufactured by Zeon Corporation) was dissolved in a dilution solvent. The solution was applied to the polypropylene film and dried to form a 3 μm-thick pressure-sensitive adhesive layer so that a surface protection film was obtained.

Example 2

A surface protection film was obtained using the process of Example 1, except that the substrate layer (support) used was a 40 μm-thick polypropylene film with both sides corona-treated which had an outer-side surface with an arithmetic average surface roughness ($Ra_1$) of 0.64 μm and a pressure-sensitive adhesive layer-side (inner-side) surface with an arithmetic average surface roughness ($Ra_2$) of 0.61 μm.

Example 3

A surface protection film was obtained using the process of Example 1, except that the substrate layer (support) used was a 40 μm-thick polypropylene film with both sides corona-treated which had an outer-side surface with an arithmetic average surface roughness ($Ra_1$) of 0.74 μm and a pressure-sensitive adhesive layer-side (inner-side) surface with an arithmetic average surface roughness ($Ra_2$) of 0.58 μm.

Example 4

A surface protection film was obtained using the process of Example 2, except that the thickness of the pressure-sensitive adhesive layer was set at 7 μm.

Example 5

A surface protection film was obtained using the process of Example 3, except that the thickness of the pressure-sensitive adhesive layer was set at 5 μm.

Comparative Example 1

A 40 μm-thick polypropylene film with both sides corona-treated was used as a substrate layer (support), which had an outer-side surface with an arithmetic average surface roughness ($Ra_1$) of 0.49 μm and a pressure-sensitive adhesive layer-side (inner-side) surface with an arithmetic average surface roughness ($Ra_2$) of 0.59 μm. A silicone-based polymer release agent (KS-847H manufactured by Shin-Etsu Chemical Co., Ltd.) was dissolved in a dilution solvent, and the solution was applied to the outer side of the substrate layer and dried to form a release-treated layer. As pressure-sensitive adhesive layer, n 100 parts by weight of a natural rubber graft copolymer (Mooney viscosity: 100, measurement conditions: MS (1+4), 100° C.) containing 30% by weight of poly(methyl methacrylate) and 30 parts by weight of a tackifier resin (Quintone A-100 manufactured by Zeon Corporation) was dissolved in a dilution solvent. The solution was applied to the polypropylene film and dried to form a 3 μm-thick pressure-sensitive adhesive layer so that a surface protection film was obtained.

Comparative Example 2

A surface protection film was obtained using the process of Example 1, except that a solution of a long-chain alkyl type release agent (Peeloil 1010 manufactured by Ipposha Oil Industries Co., Ltd.) in a dilution solvent was applied to the outer side (corona-treated surface) of the substrate layer and dried to form the release-treated layer and that the thickness of the pressure-sensitive adhesive layer was set at 12 μm.

Comparative Example 3

A 40 μm-thick polypropylene film with both sides corona-treated was used as a substrate layer (support), which had an outer-side surface with an arithmetic average surface roughness ($Ra_1$) of 1.36 μm and a pressure-sensitive adhesive layer-side (inner-side) surface with an arithmetic average surface roughness ($Ra_2$) of 1.18 μm. A long-chain alkyl type release agent (Peeloil 1010 manufactured by Ipposha Oil Industries Co., Ltd.) was dissolved in a dilution solvent, and the solution was applied to the outer side of the substrate layer and dried to form a release-treated layer. As pressure-sensitive adhesive layer, n 100 parts by weight of a natural rubber graft copolymer (Mooney viscosity: 100, measurement conditions: MS (1+4), 100° C.) containing 30% by weight of poly(methyl methacrylate) and 20 parts by weight of a tackifier resin (Quintone A-100 manufactured by Zeon Corporation) was dissolved in a dilution solvent. The solution was applied to the polypropylene film and dried to form a 3 μm-thick pressure-sensitive adhesive layer so that a surface protection film was obtained.

Comparative Example 4

A 40 μm-thick polypropylene film with both sides corona-treated was used as a substrate layer (support), which had an outer-side surface with an arithmetic average surface roughness ($Ra_1$) of 0.81 μm and a pressure-sensitive adhesive layer-side (inner-side) surface with an arithmetic average surface roughness ($R_{a2}$) of 0.70 μm. A long-chain alkyl type release agent (Peeloil 1010 manufactured by Ipposha Oil Industries Co., Ltd.) was dissolved in a dilution solvent, and the solution was applied to the outer side of the substrate layer and dried to form a release-treated layer. As pressure-sensitive adhesive layer, in 100 parts by weight of a hydrogen additive of a styrene-butadiene-styrene block copolymer (Kraton G1657 manufactured by Kraton Polymers LLC) and 20 parts by weight of a tackifier resin (Arkon P-100 manufactured by Arakawa Chemical Industries, Ltd.) was dissolved in a dilution solvent. The solution was applied to the polypropylene film and dried to form a 3 μm-thick pressure-sensitive adhesive layer so that a surface protection film was obtained.

Comparative Example 5

The substrate layer used was a 40 μm-thick polypropylene (80 wt %)-polyethylene (20 wt %) melt blend film with one side corona-treated (57% in haze according to JIS K 7136). Three parts by weight of a crosslinking agent (tetraglycidyl-1,3-bisaminomethylcyclohexane) was added to 100 parts by weight (solid) of an acrylate ester copolymer with a weight average molecular weight (polystyrene-equivalent) of 500,000 produced by copolymerization of 100 parts by weight of butyl acrylate and 5 parts by weight of acrylic acid and mixed together. A solution of the mixture in a dilution solvent was applied to the film and dried to form a 5 μm-thick pressure-sensitive adhesive layer, which was then aged at 50° C. for 48 hours, so that a surface protection film was obtained.

The surface protection film obtained in each of the Examples and the Comparative Examples was evaluated as described below. The results are shown in Table 1.

(Measurement of Haze Value)

The haze value was measured with a haze meter (HZ-1 manufactured by Suga Test Instruments Co., Ltd.) according to JIS P 8116.

(Measurement of Arithmetic Average Surface Roughness Ra)

Sample Preparation Method:

A double-sided adhesive tape with an adhesive thickness of 25±3 μm, which had been produced with a PET release liner but without a backing material, was attached to a slide glass, and the protection film was attached onto the adhesive tape in such a manner that the surface to be measured was placed face up.

The measurement was performed using an optical profiler NT-3300 (manufactured by Wyko Corporation) at n=5 under the following conditions: VSI mode objective lens, ×2.5; internal lens, ×0.5; backscan, 10 μm; length, 15 μm; threshold, 1%; Window filtering, None, 5 mm×5 mm. The upper limit and lower limit values were excluded, and the remaining three data were averaged for evaluation. The average of MD and TD was used to calculate each arithmetic average surface roughness Ra.

(Evaluation of Optical Defects)

The surface protection film was attached to a prism sheet (with a prism angle of 90° and a prism pitch of 50 μm) at a linear pressure of 18 N/cm and a rate of 3 m/minute, and the resulting laminate was stored under a pressure of 3 MPa at 50° C. for 24 hours. The protection film (50 mm×150 mm) was then peeled off at room temperature (23° C., 50% RH). The presence or absence of optical defects was visually checked from the flat face of the prism sheet opposite to the prism face according to the criteria below.

o: There was no optical defect observed in the prism sheet.
x: There was any optical defect observed in the prism sheet.

(Evaluation of Pressing Marks (Imprinting Marks))

The surface protection film was attached to a prism sheet (with a prism angle of 90° and a prism pitch of 50 μm) at a linear pressure of 18 N/cm and a rate of 3 m/minute, and the resulting laminate was stored under a pressure of 1 MPa at 50° C. for 24 hours. The protection film was then peeled off at room temperature (23° C., 50% RH). The presence or absence of optical defects was visually checked from the flat face of the prism sheet opposite to the prism face according to the criteria below.

o: There was no optical defect observed in the prism sheet.
x: There was any optical defect observed in the prism sheet.

TABLE 1

| | | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
| Substrate layer | Arithmetic average surface roughness (μm) | Outer side (back surface) $Ra_1$ | 0.64 | 0.64 | 0.74 | 0.64 | 0.74 | 0.49 | 0.65 | 1.36 | 0.81 | 0.21 |
| | | Inner side (pressure-sensitive adhesive layer-side surface) $Ra_2$ | 0.58 | 0.61 | 0.58 | 0.61 | 0.59 | 0.59 | 0.58 | 1.18 | 0.70 | 0.23 |

TABLE 1-continued

|  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Pressure-sensitive adhesive layer | Pressure-sensitive adhesive | Rubber-based | Rubber-based | Rubber-based | Rubber-based | Rubber-based | Rubber-based | Rubber-based | Rubber-based | Rubber-based | Acrylic |
|  | Thickness (μm) | 3.0 | 2.0 | 3.0 | 7.0 | 5.0 | 3.0 | 12.0 | 3.0 | 7.0 | 10.0 |
| Evaluation of properties | Haze value (%) | 34.5 | 56.5 | 46.5 | 57.9 | 47.1 | 60.3 | 34.5 | 57.1 | 20.1 | 15.7 |
|  | Optical defect | ○ | ○ | ○ | ○ | ○ | ○ | ○ | X | ○ | X |
|  | Pressing mark | ○ | ○ | ○ | ○ | ○ | X | X | ○ | X | X |

Table 1 shows that even when a prism sheet was used as an adherend, the surface protection film prepared in each of Examples 1 to 5 had a high level of adhesion reliability, did not affect optical properties of the adherend, and allowed an appearance inspection while it was attached to the adherend.

The invention claimed is:

1. An optical surface protection film, comprising:
   a substrate layer; and
   a pressure-sensitive adhesive layer placed on one side of the substrate layer, wherein the substrate layer has a pressure-sensitive adhesive layer-side surface with an arithmetic average surface roughness ($Ra_1$) of 0.65 μm or less and another surface with an arithmetic average surface roughness ($Ra_2$) of 0.6 μm to 1.0 μm,
   wherein the optical surface protective film is further characterized in that it has no pressing marks when evaluated by attaching the optical surface protective film to a prism sheet, which prism sheet has a prism angle of 90° and a prism pitch of 50 μm, at a linear pressure of 18 N/cm and a rate of 3 m/minute, storing the resulting laminate under a pressure of 1 MPa at 50° C. for 24 hours, peeling off the optical surface protective film at 23° C. and 50% relative humidity, and visually determining from the flat face of the prism sheet opposite to the prism face the presence or absence of pressing marks,
   wherein the substrate layer is formed from polypropylene, and
   wherein the pressure-sensitive adhesive layer is made of a rubber-based pressure sensitive adhesive.

2. The optical surface protection film of claim 1, wherein it has a haze value of 30 to 75%.

3. The optical surface protection film of claim 1, wherein the pressure-sensitive adhesive layer thickness is 2 to 10 μm.

4. The optical surface protection film of claim 1, wherein it is for use in protecting a prism sheet surface.

5. An optical film with surface protection film, comprising:
   an optical film; and
   the optical surface protection film of claim 1 attached to one or both sides of the optical film.

6. A prism sheet with surface protection film, comprising:
   a prism sheet; and
   the optical surface protection film of claim 1 attached to one or both sides of the prism sheet.

7. The optical surface protection film of claim 2, wherein the pressure-sensitive adhesive layer thickness is 2 to 10 μm.

8. The optical surface protection film of claim 1, wherein the arithmetic average surface roughness $Ra_2$ is 0.5 μm or less.

9. The optical surface protection film of claim 1, further comprising a release-treated layer.

10. The prism sheet with surface protection film of claim 6, which has been formed into a roll.

11. A stack of several tens of prism sheets with surface protection film according to claim 6.

12. The optical surface protection film of claim 1, wherein the arithmetic average surface roughness $Ra_2$ is 0.5 μm to 0.65 μm.

* * * * *